(12) United States Patent
Sweet et al.

(10) Patent No.: US 10,814,407 B2
(45) Date of Patent: Oct. 27, 2020

(54) AXIALLY AND RADIALLY COMPLIANT DEBURRING TOOL

(71) Applicant: ATI Industrial Automation, Inc., Apex, NC (US)

(72) Inventors: Tucker Sweet, Cary, NC (US); Douglas K. Lawson, Chapel Hill, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 102 days.

(21) Appl. No.: 15/705,658

(22) Filed: Sep. 15, 2017

(65) Prior Publication Data

US 2019/0084056 A1    Mar. 21, 2019

(51) Int. Cl.
| | | |
|---|---|---|
| *B23B 31/08* | (2006.01) | |
| *B23B 29/034* | (2006.01) | |
| *B23B 51/10* | (2006.01) | |
| *B23D 79/02* | (2006.01) | |

(52) U.S. Cl.
CPC ............ *B23B 51/102* (2013.01); *B23B 31/08* (2013.01); *B23D 79/02* (2013.01); *B23B 51/101* (2013.01); *B23B 2220/08* (2013.01)

(58) Field of Classification Search
CPC ... B23B 51/101; B23B 51/102; B23B 51/105; B23B 31/08; B23B 2220/08; B23B 29/03457; B23B 31/026; Y10T 408/8595; Y10T 82/12; Y10T 408/85884; Y10T 408/865; Y10T 408/85; B23D 79/02
See application file for complete search history.

(56) References Cited

U.S. PATENT DOCUMENTS

| | | | | | |
|---|---|---|---|---|---|
| 2,188,205 | A | * | 1/1940 | Osborne | B23B 31/08 279/16 |
| 2,189,002 | A | * | 2/1940 | Hammer | B23B 31/08 279/16 |
| 2,468,396 | A | * | 4/1949 | Frisco | B23B 31/08 279/18 |
| 2,475,385 | A | * | 7/1949 | Frisco | B23B 31/08 279/16 |
| 6,302,408 | B1 | * | 10/2001 | Zierpka | B23B 31/005 279/14 |

FOREIGN PATENT DOCUMENTS

DE          809878 C  *  8/1951  ............. B23B 31/08

* cited by examiner

*Primary Examiner* — Sunil K Singh
*Assistant Examiner* — Paul M Janeski
(74) *Attorney, Agent, or Firm* — Coats & Bennett, PLLC (57) ABSTRACT

An axially and radially compliant deburring tool holds a commercially available end tool holder, which in turn holds a variety of commercially available interchangeable deburring end tools, such as those commercially available for the hand deburring market. The axially and radially compliant deburring tool exhibits axial compliance in response to an external force by allowing a longitudinal sleeve holding the end tool holder to move longitudinally along a longitudinal axis of the tool, against a bias force. The axially and radially compliant deburring tool exhibits radial compliance in response to an external force by interaction between a cam contact member and a concave cam surface, both under the bias force and hence operative to return the commercially available to a centered, extended position in the absence of external forces.

15 Claims, 6 Drawing Sheets

AXIALLY AND RADIALLY COMPLIANT DEBURRING TOOL

FIELD OF INVENTION

The present invention relates generally to deburring tools for automated equipment and in particular to an axially and radially compliant deburring tool operative to accept interchangeable deburring end tools commercially available in the hand deburring market.

BACKGROUND

Industrial robots and related automated equipment, such as Computer Numeric Controlled (CNC) machines, are a common and indispensable part of modern manufacturing. Automated equipment performs routine and repetitive tasks tirelessly, in hostile environments, and with high precision and repeatability. Such tasks include the deburring of the edges of machined or cast parts, or the related task of cutting away material from injection molded or blow-molded parts. Conventionally, the deburring or trimming has been done by hand. It is known to use a robotic arm fitted with a deburring or cutting tool and programmed to follow a path around the edge of a particular part or object which is to be deburred or trimmed. As used herein, the term "deburring" is to be construed broadly, to include grinding, filing, polishing, cutting, trimming, and similar finishing operations.

There are some difficulties normally associated with the use of automatically controlled deburring tools. Since the programmed path of a robotic arm is in essence a series of incremental steps, the path of the automatically controlled deburring tool may not exactly coincide with the shape or contours of the surface to be deburred. In addition, the edge or surface of a workpiece may have cavities or protrusions, which interfere with the path and cutting force of the robotic tool. A protrusion will urge the cutting surface of the deburring tool out of its programmed path and cause a consequent increase in cutting force. The increased cutting force may cause the deburring tool to cut too deep into the surface. Moreover, the increased cutting force may cause damage to the cutting surface of the tool. A cavity on the other hand may cause the deburring tool to separate or diverge from the surface to be deburred. The separation of the cutting surface of the tool from the surface to be deburred will prevent the deburring of that portion of the part or workpiece. Consequently, the overall quality of the product being deburred will be affected.

In addition to part variations, there are fixture variations. Fixtures are structures that hold the parts while the parts are being subjected to deburring. Fixtures are designed to hold the parts such that the surface to be deburred aligns with the programmed path of the deburring tool. However, typically, these fixtures will have variations, and the variations will result in the surfaces of the parts to be deburred being misaligned with the programmed path of the deburring tool.

Due to these known problems with automated deburring operations, many deburring tasks are performed manually. Unlike robots, humans receive both visual cues and tactile feedback, and accommodate surface imperfections and misaligned fixtures as a matter of course. However, overcoming the problems associated with automated deburring would bring the known benefits of automation, such as speed, accuracy, precision, repeatability, tirelessness, and operation in hostile environments, to the deburring operation.

One approach to addressing these problems is compliance in the automated deburring tool. Compliance compensates for errors in the path and variations in parts and fixtures by permitting limited movement of the tool while maintaining an acceptable cutting force. In this way, variations in the surface being deburred, or inaccuracies in the programmed path which are within the limits of the compliance, will be accommodated and damage to the cutting surface of the tool and the finished product will be minimized.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, an axially and radially compliant deburring tool holds a commercially available end tool holder, which in turn holds a variety of commercially available interchangeable deburring end tools, such as those commercially available for the hand deburring market. The axially and radially compliant deburring tool exhibits axial compliance in response to an external force by allowing a longitudinal sleeve holding the end tool holder to move longitudinally along a longitudinal axis of the tool, against a bias force. The axially and radially compliant deburring tool exhibits radial compliance in response to an external force by interaction between a cam contact member and a concave cam surface, both under the bias force and hence operative to return the commercially available to a centered, extended position in the absence of external forces.

One embodiment relates to an axially and radially compliant deburring tool. The deburring tool includes a housing having a longitudinal axis and a longitudinal sleeve operative to hold an end tool holder, which is operative to hold an interchangeable deburring end tool. The deburring tool also includes a pivoting sleeve operative to slideably hold the longitudinal sleeve, and a pivoting suspension connecting the pivoting sleeve to the front of the housing. The pivoting suspension is operative to allow the pivoting sleeve to pivot about the longitudinal axis in all radial directions. The deburring tool further includes a cam contact member and a cam block including a concave cam surface. One of the cam contact member and cam block is affixed to the longitudinal sleeve. The other of the cam contact member and cam block is slideably mounted within the housing, and biased away from a back of the housing. This element is operative to provide axial compliance by moving along the longitudinal axis in response to an external axial force exerted on the longitudinal sleeve. The element is also operative to provide radial compliance by moving along the longitudinal axis in response to interaction between the cam contact member and the concave cam surface as the longitudinal sleeve pivots from alignment with the longitudinal axis under an external force.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

As mentioned above, deburring is typically a manual operation. Accordingly, a wide variety of interchangeable deburring end tools, and end tool holders that facilitate their mounting within a handle, are made for hand deburring operations, and are commercially available. One example of commercially available deburring end tools is the SHAVIV line of deburring blades and scrapers available from VARGUS of Nahariya, Israel. Another are the blades, countersinks, scrapers, cutting and ceramic tools available for the NOGA deburring tools, available from Noga Engineering, Inc. of Shlomi, Israel. These deburring blades, scrapers, and the like come in a wide variety of shapes and sizes. They generally include a tool (blade, scraper, etc.) that is inserted into an end tool holder. The end tool holder comprises a shaft having ridges formed in one flattened surface thereof. The end tool holder is designed to be removeably inserted into deburring tool handles, and is held securely in such handles by various detent mechanisms, which engage the ridges formed on the shaft of the end tool holder. According to embodiments of the present invention, a radially and axially compliant deburring tool, which may be operated by a robotic arm, a CNC machine, or other automated equipment, is designed to accept and utilize the vast array of interchangeable deburring end tools, together with their end tool holders, which are available in the hand deburring market. This increases the flexibility of the radially and axially compliant deburring tool, and increases the number of applications for which it may be advantageously employed.

Figure 1:
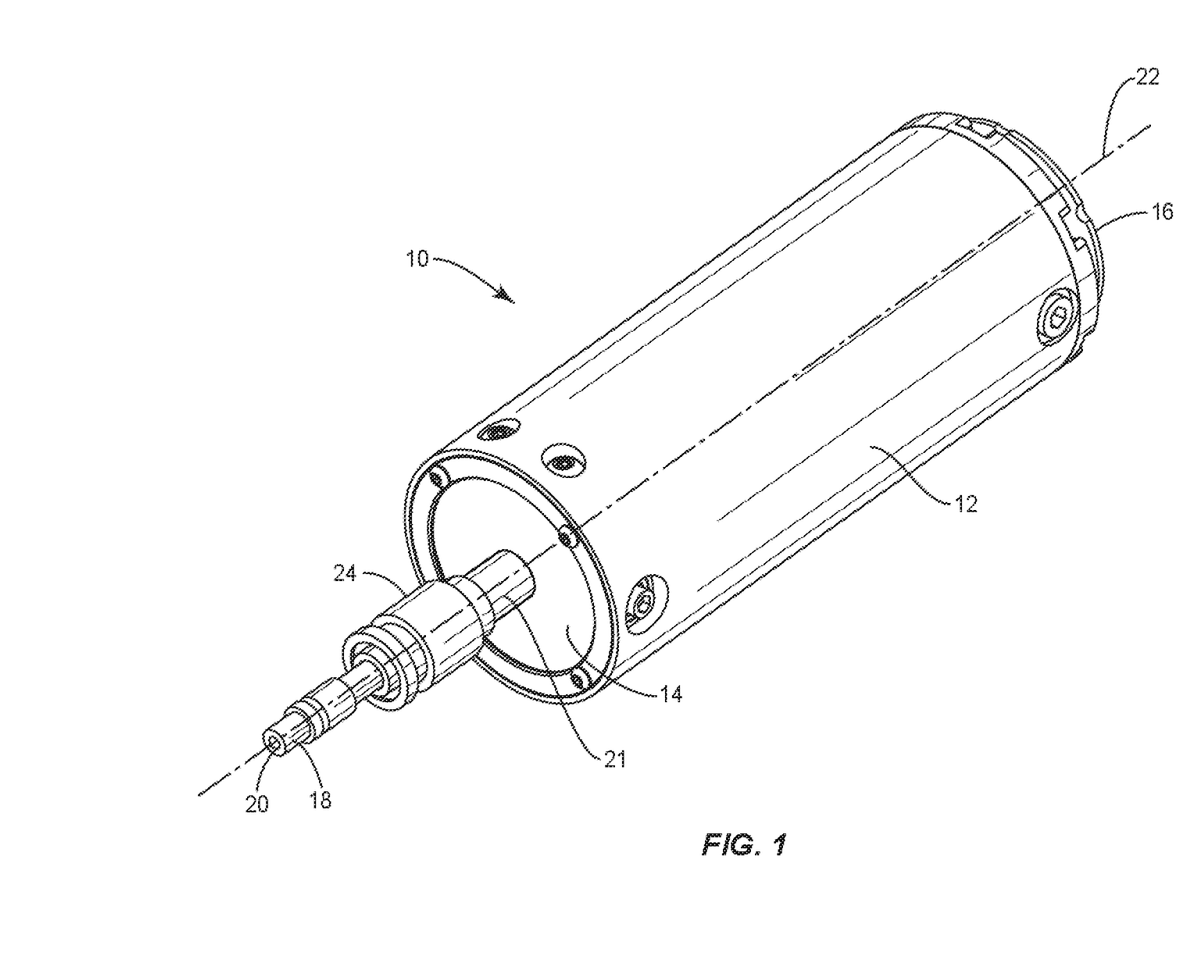
FIG. 1 is a perspective view of a first embodiment of an axially and radially compliant deburring tool.

FIG. 1 depicts a first embodiment of an axially and radially compliant deburring tool 10. The deburring tool 10 comprises a housing 12, into which is asserted a commercially available end tool holder 18. In this embodiment, the housing 12 is generally cylindrical, although this shape is not limiting. The housing 12 has a front 14 and a back 16. The end tool holder 18 partially extends from the front 14 of the housing 12. The end tool holder 18 is operative to hold an interchangeable deburring end tool, which is inserted in a central bore 20 in the end tool holder 18. The end tool holder 18 (and bore 20), in the default position depicted in FIG. 1, is aligned with a longitudinal axis 22 of the robotic deburring tool 10.

As mentioned above, to increase the utility and amortize the cost of the axially and radially compliant deburring tool 10, a bore 20 in the end tool holder 18 is sized and shaped to accept the shafts of a wide variety of commercially available interchangeable deburring end tools. In one embodiment, the deburring tool 10 includes a detent-based end tool locking mechanism 24 operative to securely hold an end tool holder 18. The detent-based end tool locking mechanism 24 allows the end tool holder 18 to be positioned at a variety of positions along the longitudinal axis 22.

To facilitate deburring operations on parts having protruding parts or recess, fixtures having imprecise shape or alignment, and/or similar problems with automated deburring operations, the end tool holder 18 is compliant with respect to the housing 12 in both axial and radial directions.

As used herein, axial compliance means the end tool holder 18 is operative to move, along the longitudinal axis 22, toward the back 16 of the housing 12, under an external force applied to an interchangeable deburring end tool secured in the end tool holder 18. The external force may include the force exerted on the interchangeable deburring end tool by a workpiece in response to a robot or other automated equipment moving the robotic deburring tool 10 towards and into contact with the workpiece. Upon the removal of the external force, the end tool holder 18 will return to its partially extended position with respect to the housing 12, also referred to herein as a default position, as depicted in FIG. 2.

Figure 2:
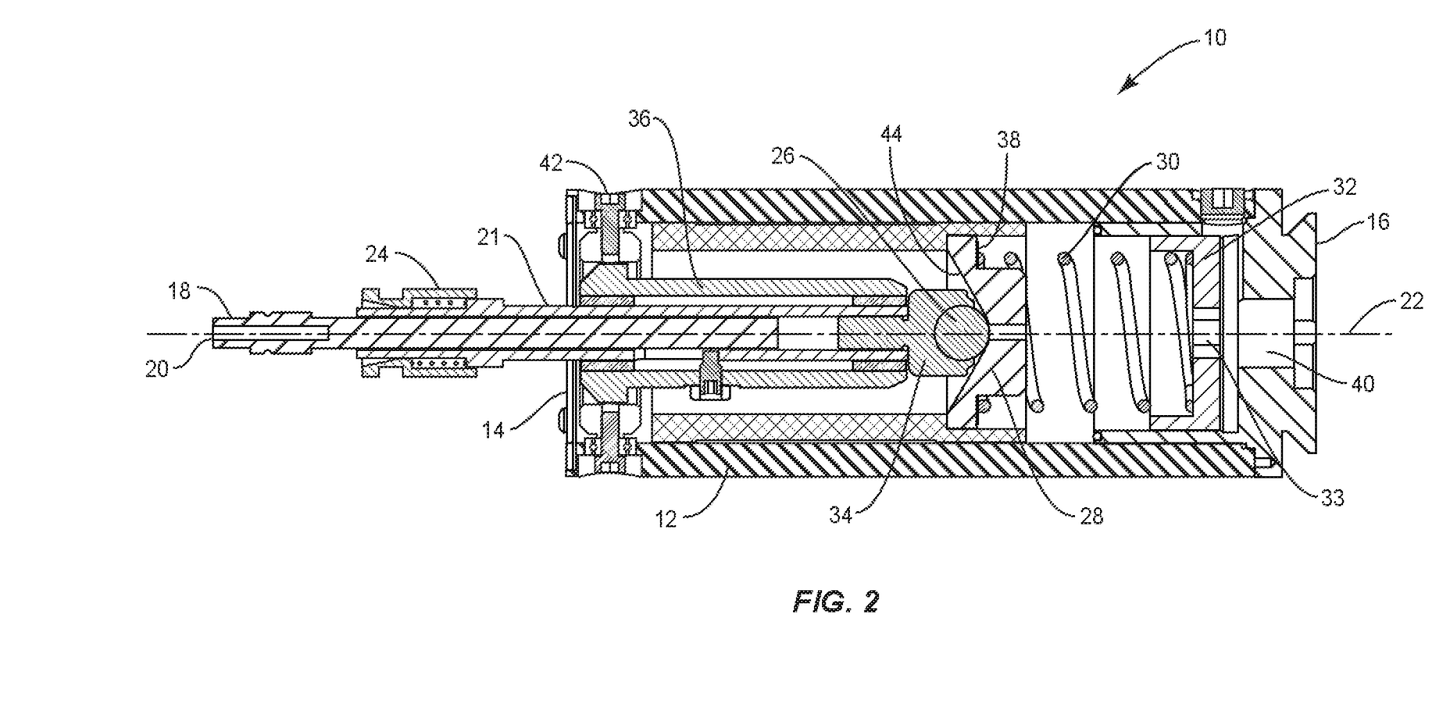
FIG. 2 is a section view of the axially and radially compliant deburring tool of FIG. 1 in a default position.

FIG. 2 depicts a section view of the first embodiment of the axially and radially compliant deburring tool 10 of FIG. 1. Axial compliance is accomplished by interaction of the end tool holder 18, longitudinal sleeve 21, cam contact member 26, cam block 28, bias spring 30, and spring force adjustment cup 32. The end tool holder 18 is disposed within a longitudinal sleeve 21. The longitudinal sleeve 21, containing the end tool holder 18, is slideably mounted within a pivoting sleeve 36. This allows the longitudinal sleeve 21, and hence the end tool holder 18, to move along the longitudinal axis 22. The cam contact member 26 is held by a cam contact member holding block 34, which is affixed to the back of the longitudinal sleeve 21. The forward-most, default position of the longitudinal sleeve 21, and hence the end tool holder 18, is defined by the cam contact member holding block 34 contacting the pivoting sleeve 36.

The cam contact member 26 contacts a cam block 28, which is slideably mounted within the housing 12 and operative to move along the longitudinal axis 22. The cam block 28 is biased toward the front 14 of the housing 12 by a bias force, provided (in the embodiment shown) by a bias spring 30. In other embodiments, the bias force may be provided by a pneumatically or hydraulically driven piston, a solenoid, a voice coil, pneumatic artificial muscles (PAM), or other axial force producing mechanism, as known in the art. In the embodiment depicted, the bias spring 30 is seated, towards the back 16 of the housing 12, in a spring force adjustment cup 32. At the other end, the bias spring 30 is seated against a flange 38 formed on the cam block 28.

Figure 3:
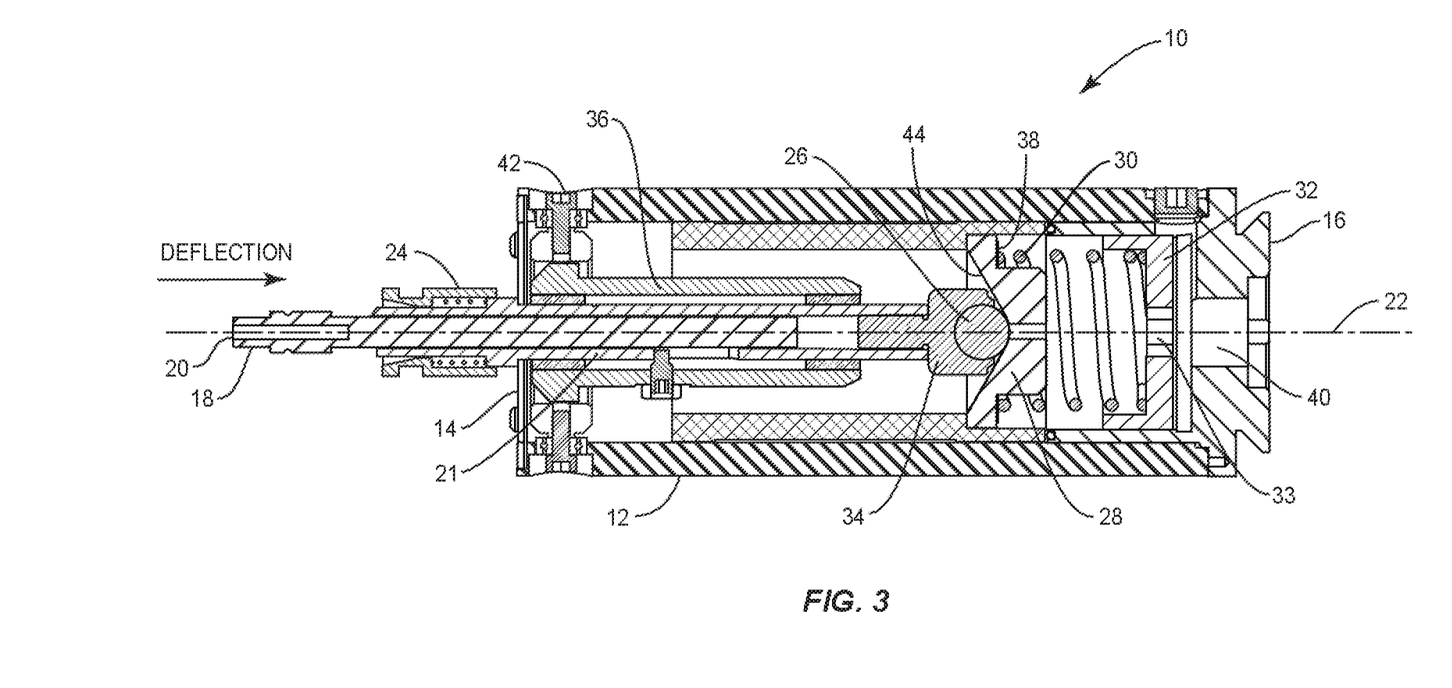
FIG. 3 is a section view of the axially and radially compliant deburring tool of FIG. 1 under axial compliance.

FIG. 3 depicts the axially and radially compliant deburring tool 10 under full axial compliance, wherein an external force deflects the end tool holder 18 into the housing 12, against the force of the bias spring 30. The bias spring 30 is compressed, and the cam block 28, cam contact member 26, cam contact member holding block 34, and longitudinal sleeve 21 holding the end tool holder 18, are all displaced, from their default position, towards the rear 16 of the housing 12.

In one embodiment, the axial compliance force is at least partially adjustable. In particular, in the embodiment depicted, the outer surface of the spring force adjustment cup 32 is threaded, and a corresponding portion of the inner surface of the housing 12 is threaded. A hex (or other shaped) receptacle 33 in the back of the spring force adjustment cup 32 accepts a corresponding tool inserted through a bore 40 in the housing 12, to rotate the spring force adjustment cup 32. This adjusts the "preload" force on the bias spring 30 by changing the axial position of the spring force adjustment cup 32 within the housing 12. Those of skill in the art will readily recognize that other bias force adjustment mechanisms are possible within the scope of the present invention.

As used herein, radial compliance means the end tool holder 18 is operative to pivot from alignment with the longitudinal axis 22, in any radial direction, under an external force applied to an interchangeable deburring end tool secured in the end tool holder 18. The external force may include the force exerted on the axially and radially compliant deburring tool 10 by a workpiece in response to a robot or other automated equipment moving the axially and radially compliant deburring tool 10 against the workpiece. Upon the removal of the external force, the end tool holder 18 will return to its centered position with respect to the housing 12, also referred to herein as the default position—that is, aligned with the longitudinal axis 22—as depicted in FIG. 2.

Figure 4:
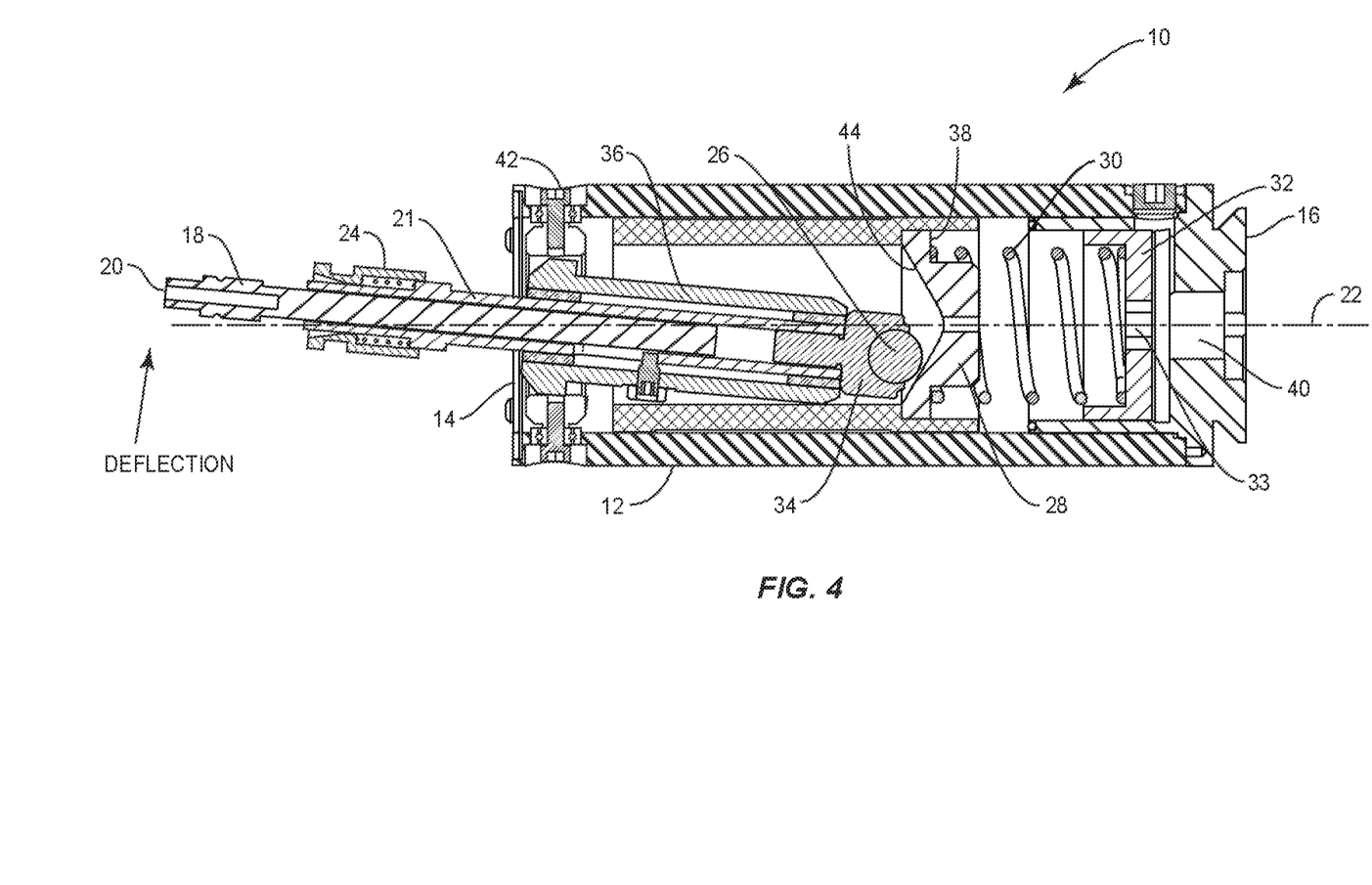
FIG. 4 is a section view of the axially and radially compliant deburring tool of FIG. 1 under radial compliance.

FIG. 4 depicts the axially and radially compliant deburring tool 10 under full radial compliance, wherein an external force deflects the end tool holder 18 to the side, causing it and the longitudinal sleeve 21 to pivot out of alignment with the longitudinal axis 22. The pivoting sleeve 36 is connected to the housing 12 at the front 14 thereof by a pivoting suspension 42. The pivoting suspension 42 allows the pivoting sleeve 36 (and hence longitudinal sleeve 21 and end tool holder 18) to pivot in any radial direction. In one embodiment, the pivoting suspension 42 comprises a two-axis gimbal, although this is not limiting.

As an interchangeable deburring end tool, and hence the front of the end tool holder 18, is deflected in a radial direction, the cam contact member 26, attached to the back of the longitudinal sleeve 21, is deflected within the housing 12 in the opposite radial direction. The cam block 28 includes a concave cam surface 44 formed in the front thereof, facing the cam contact member 26. Interaction between the cam contact member 26 and the concave cam surface 44, under radial compliance, displaces the cam block 28 toward the back 16 of the housing 12, against the bias force, such as that provided by the bias spring 30. That is, the cam contact member 26 acts similarly to a cam follower, except that, upon the application of an external deflecting force, the cam contact member 26 displaces the cam block 28, according to the shape of the concave cam surface 44, rather than being driven by it. When the external force is removed, the bias force and interaction between the cam contact member 26 and the concave cam surface 44 act to center the cam contact member 26 at the center of the concave cam surface 44, thus returning the longitudinal sleeve 21, and hence the end tool holder 18, to the centered, or default, position—that is, aligned with the longitudinal axis 22—as depicted in FIG. 2. During this recovery—returning the deburring tool 10 to its default position following the removal of an external deflecting force—the cam contact member 26 acts as a traditional cam follower in its interaction with the concave cam surface 44.

In the embodiment depicted in FIGS. 2 and 4, the concave cam surface 44 is substantially conical. In one embodiment, the angle of the substantially conical cam surface 44 is approximately 45°. However, other angles—and indeed, other shapes—for the concave cam surface 44 are contemplated within the scope of the present invention. In general, for a given deflection of the end tool holder 18, a steeper angle of the cam surface 44 will require a greater axial displacement of the cam block 28, which will present a "stiffer" compliance as greater force will be required to overcome the bias force. Conversely, a shallower angle of the cam surface 44 will present a lower compliance force. The concave cam surface 44 may also assume a non-conical shape, such as hemispherical, parabolic, or other concave shape. For example, in some embodiments in may be desirable to alter the radial compliance force as a function of the degree of compliance (i.e., the degree of displacement of the end tool 18 from alignment with the longitudinal axis 22). This may be accomplished by altering the angle of the concave cam surface 44 as a function of the distance from the center of the cam block 28.

Similarly, the cam contact member 26 is not, in general, limited to a spherical shape, as depicted. Rather, the cam contact member 26 may assume any shape that, in any given configuration of deburring tool 10, provides the optimal compliance force and resetting operation.

Figure 5:
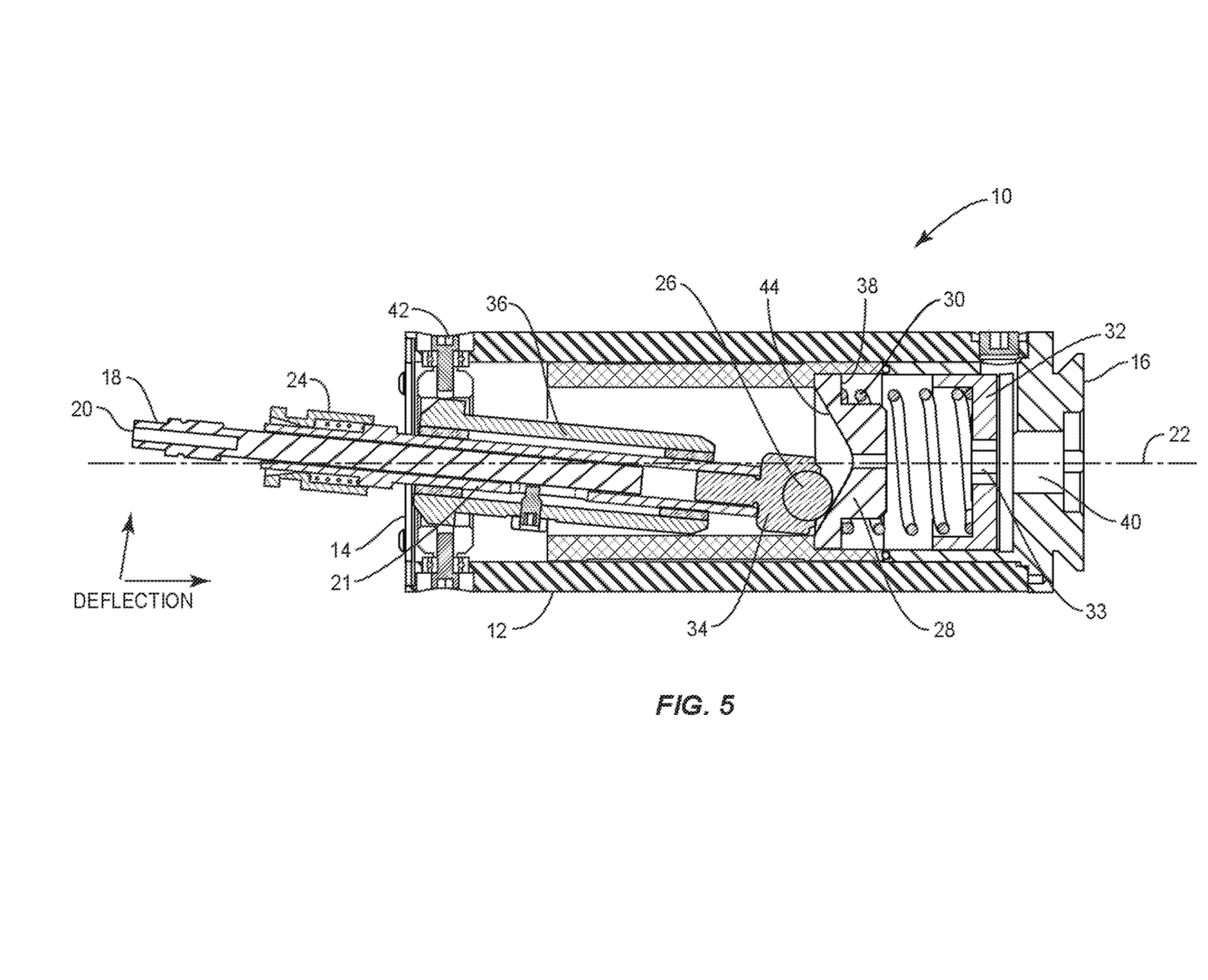
FIG. 5 is a section view of the axially and radially compliant deburring tool of FIG. 1 under both axial and radial compliance.

Although described separately herein for clarity of explanation, axial and radial compliance may occur simultaneously. FIG. 5 depicts the axially and radially compliant deburring tool 10 undergoing both axial and radial compliance. The cam block 28 is displaced slightly toward the rear 16 of the housing 12 by interaction between the cam contact member 26 and concave cam surface 44 under radial compliance. However, the cam block 28 is also further displaced toward the rear 16 under radial compliance. Upon removal of all external forces, the bias force provided by, e.g., the bias spring 30, will act to return the axially and radially compliant deburring tool 10 to its default position, with the bit holder 18 both centered, in alignment with the longitudinal axis 18, and extended to its forward-most position, as depicted in FIG. 2.

Figure 6:
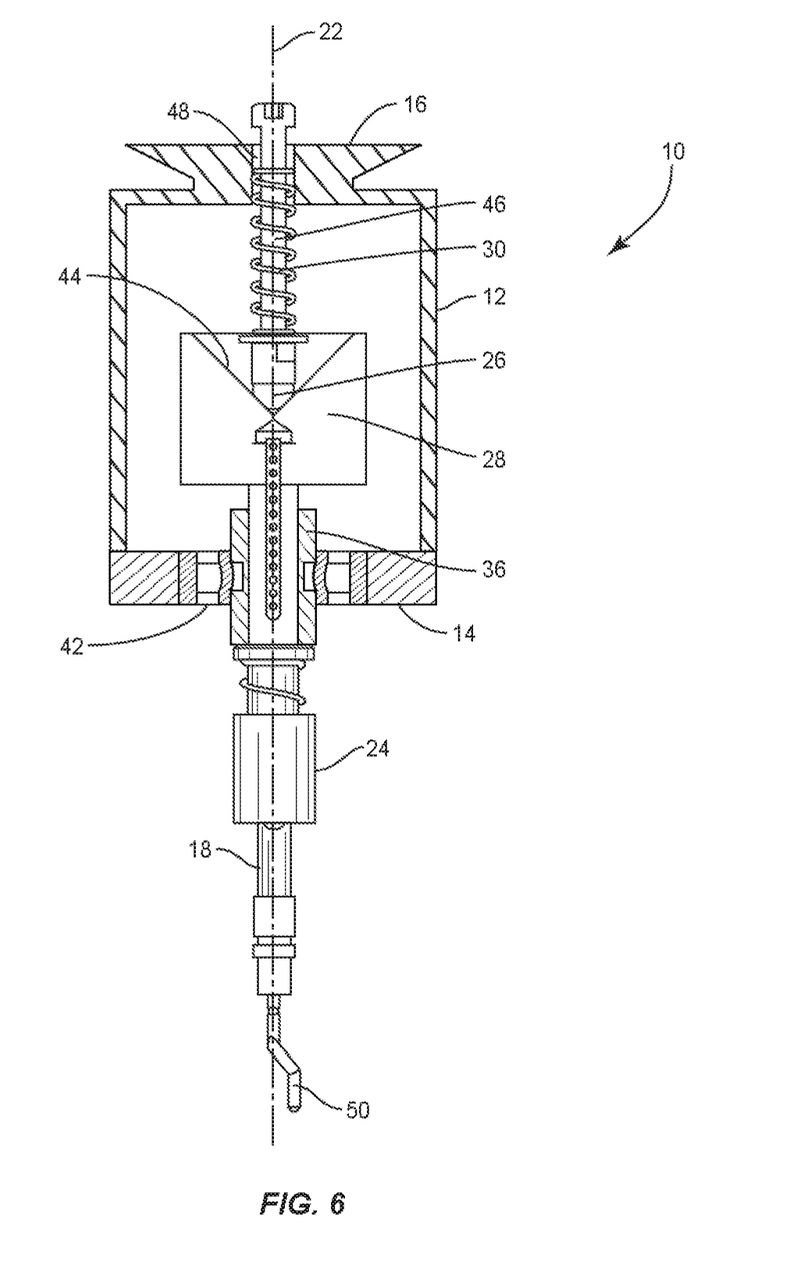
FIG. 6 is a section view of a second embodiment of an axially and radially compliant deburring tool.

FIG. 6 depicts a second embodiment of an axially and radially compliant deburring tool 10. In this embodiment, the relative positions of the cam block 28 with a concave cam surface 44, and the cam contact member 26, are reversed. That is, the cam block 28 is affixed to the back of the end tool holder 18, with the concave cam surface 44 facing the back 16 of the housing 12. The cam contact member 26, which faces the front 14 of the housing 12, so as to contact the concave cam surface 44, is affixed to a plunger 46. The plunger 46 is slideably mounted in a bore 48 in the back 16 of the housing 12. The plunger 46 and cam contact member 26 are biased toward the front 14 of the housing 12 by the bias spring 30. Under both axial and radial compliance, the axially and radially compliant deburring tool 10 according to the second embodiment operates substantially as described above for the first embodiment, but with the cam contact member 26 and plunger 46 moving axially within the housing 12 rather than the cam block 28. Additionally, and oppositely to the first embodiment described above (FIGS. 2-5), during compliance, the cam contact member 26 acts as a cam follower, being driven by motion of the concave cam surface 44 of the cam block 28. During recovery—that is, returning the deburring tool 10 to its default position with the end tool holder 18 centered on the longitudinal axis 22 and extended to a forward position—the cam contact member 26 drives the cam block 28. FIG. 6 also depicts an interchangeable deburring end tool 50—in this case, having a blade—inserted in the end tool holder 18.

Embodiments of the present invention present numerous advantages over prior art deburring tools. By providing both axial and radial compliance, the deburring tool 10 may find application in automatically deburring, cutting, trimming, dressing, polishing, and otherwise finishing a variety of workpieces, which tasks are currently performed by hand. By configuring the end tool holder 18 to hold commercially available interchangeable deburring end tools made for the hand deburring market, a very large array of end tools are available, to address virtually any deburring application. The flexibility and versatility of the axially and radially compliant deburring tool 10 is further enhanced by providing for control over the axial and radial compliance forces, such as by adjusting the compression of the bias spring 30, and/or altering the shape of the concave cam surface 44.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An axially and radially compliant deburring tool, comprising:
   a housing having a longitudinal axis;
   a longitudinal sleeve operative to hold an end tool holder, which is operative to hold an interchangeable deburring end tool;
   a pivoting sleeve operative to slideably hold the longitudinal sleeve such that the longitudinal sleeve is operative to slide within the pivoting sleeve during operation of the axially and radially compliant deburring tool;
   a pivoting suspension connecting the pivoting sleeve to the front of the housing such that the pivoting suspension continuously contacts the housing, and operative to allow the pivoting sleeve to pivot about the longitudinal axis in all radial directions;
   a cam contact member; and
   a cam block including a concave cam surface;
   wherein one of the cam contact member and cam block is affixed to the longitudinal sleeve; and
   wherein the other of the cam contact member and cam block is slideably mounted within the housing, biased away from a back of the housing, and operative to provide axial compliance by moving along the longitudinal axis in response to an external axial force exerted on the end tool holder, and operative to provide radial compliance by moving along the longitudinal axis in response to interaction between the cam contact member and the concave cam surface as the longitudinal sleeve pivots from alignment with the longitudinal axis under an external force.

2. The deburring tool of claim 1 further comprising an axial force producing mechanism providing a bias force operative to position the longitudinal sleeve in an extended position in the absence of an external force.

3. The deburring tool of claim 2 wherein the axial force producing mechanism comprises a spring.

4. The deburring tool of claim 2 wherein the axial force producing mechanism is adjustable, so as to adjust magnitude of the bias force produced by the axial force producing mechanism.

5. The deburring tool of claim 2 wherein interaction between the cam contact member and the concave cam surface, under the bias force, is operative to center the longitudinal sleeve along the longitudinal axis in the absence of an external force.

6. The deburring tool of claim 1 wherein the concave cam surface is a conical cam surface.

7. The deburring tool of claim 6 wherein the conical cam surface is substantially 45° with respect to the longitudinal axis.

8. The deburring tool of claim 1 wherein the cam contact member has a substantially spherical shape at its contact with the concave cam surface.

9. The deburring tool of claim 1 further comprising a detent-based end tool locking mechanism operative to securely hold an end tool holder.

10. The deburring tool of claim 9 wherein the detent-based end tool locking mechanism is operative to secure the end tool holder at any of a plurality of positions along a shaft of the end tool holder.

11. The deburring tool of claim 1 wherein the pivoting suspension comprises a two-axis gimbal.

12. The deburring tool of claim 1 wherein the cam contact member is attached to the longitudinal sleeve, and wherein the cam block is slideably disposed in the housing with the concave cam surface facing the cam contact member, and is biased away from the back of the housing.

13. The deburring tool of claim 12 wherein as the longitudinal sleeve pivots from alignment with the longitudinal axis under an external force, interaction between the cam contact member and the concave cam surface is operative to displace the cam block toward the back of the housing, against a bias force.

14. The deburring tool of claim 1 wherein the cam block is attached to the longitudinal sleeve with the concave cam surface facing the back of the housing, and wherein the cam contact member is attached to a plunger slideably disposed in a bore in the back of the housing and biased toward the front of the housing.

15. The deburring tool of claim 14 wherein as the longitudinal sleeve pivots from alignment with the longitudinal axis under an external force, the concave cam surface is operative to displace the cam contact member toward the back of the housing, against a bias force.

* * * * *